F. MEYER.
CALCINING, DESULFURIZING, AND AGGLOMERATING ORES, &c.
APPLICATION FILED NOV. 9, 1907. RENEWED SEPT. 11, 1913.
1,166,142.
Patented Dec. 28, 1915.
6 SHEETS—SHEET 4.
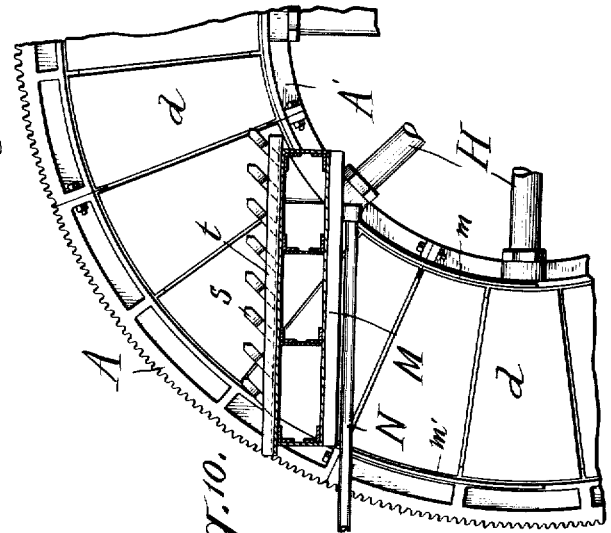
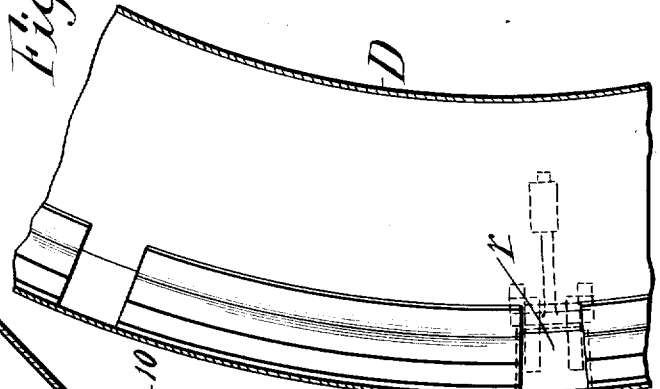
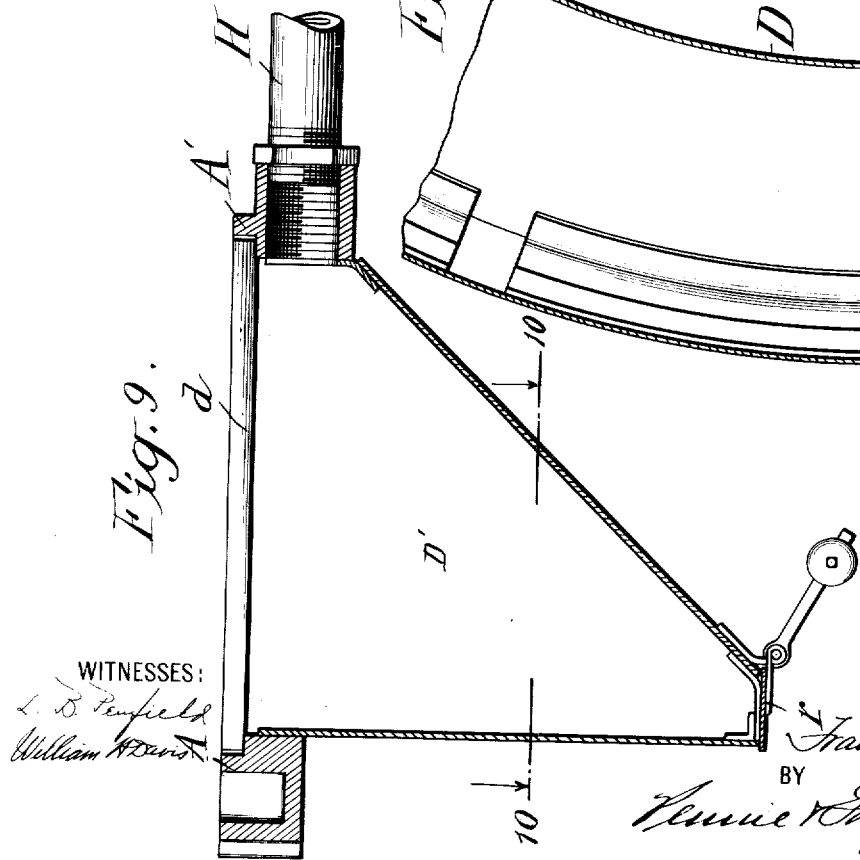
WITNESSES:
INVENTOR:
Franz Meyer,
BY
ATTORNEYS

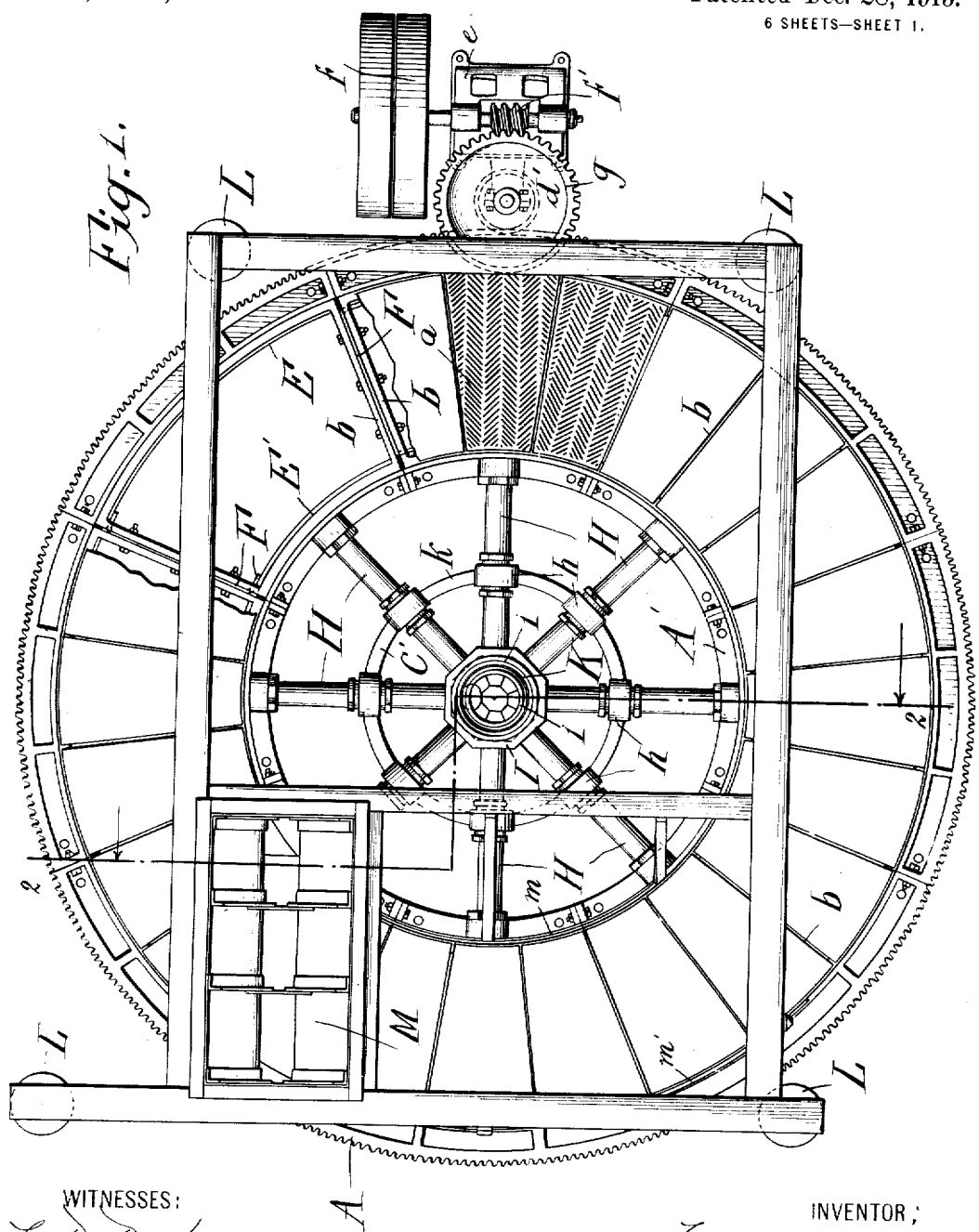

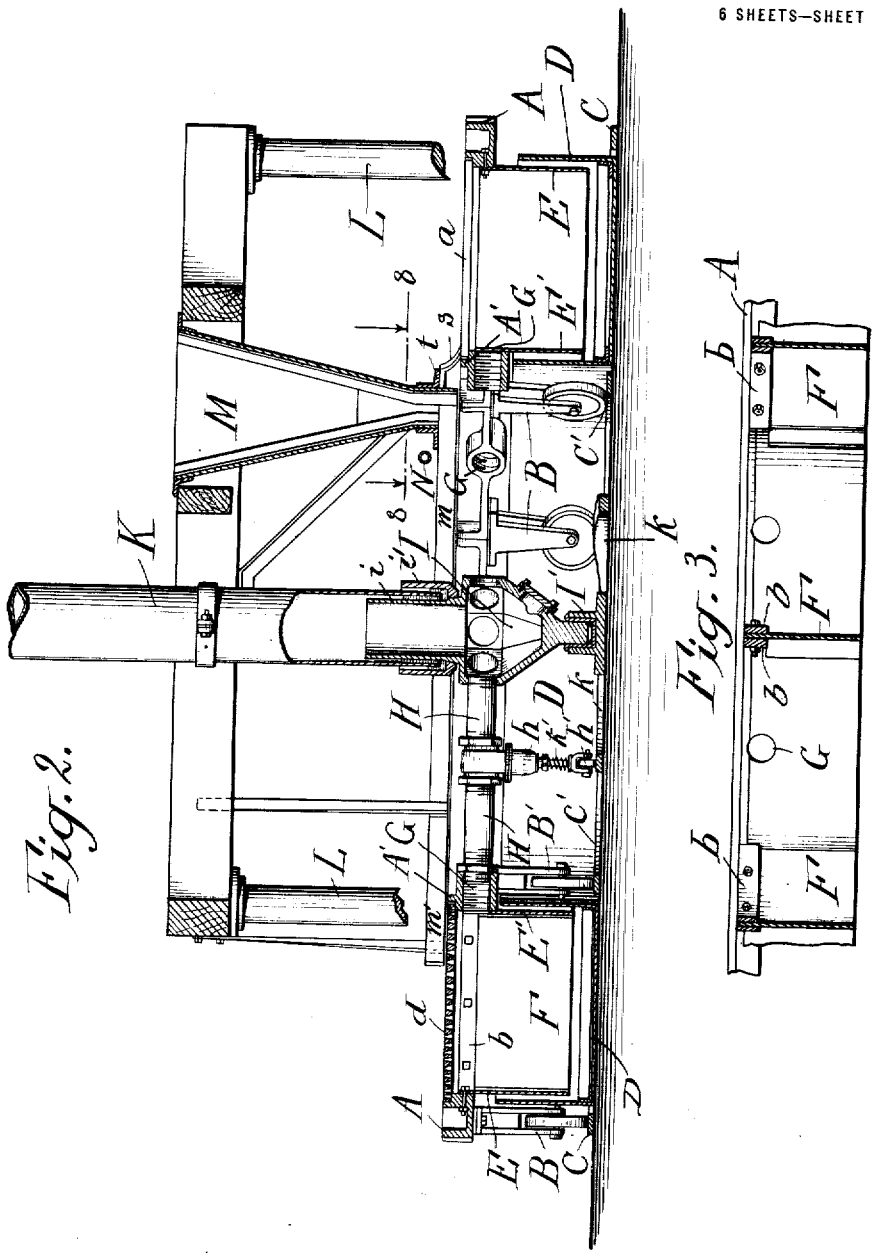

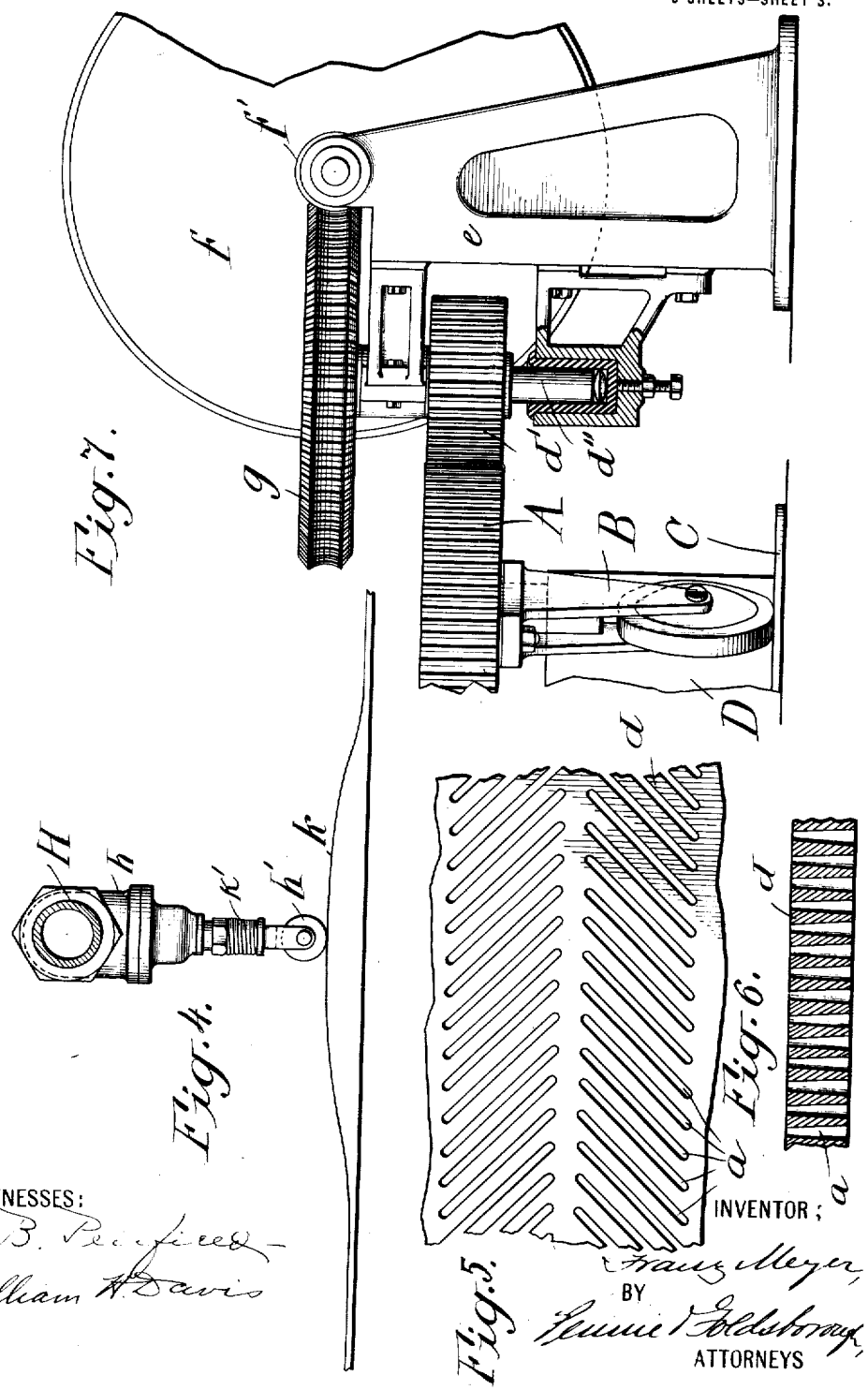

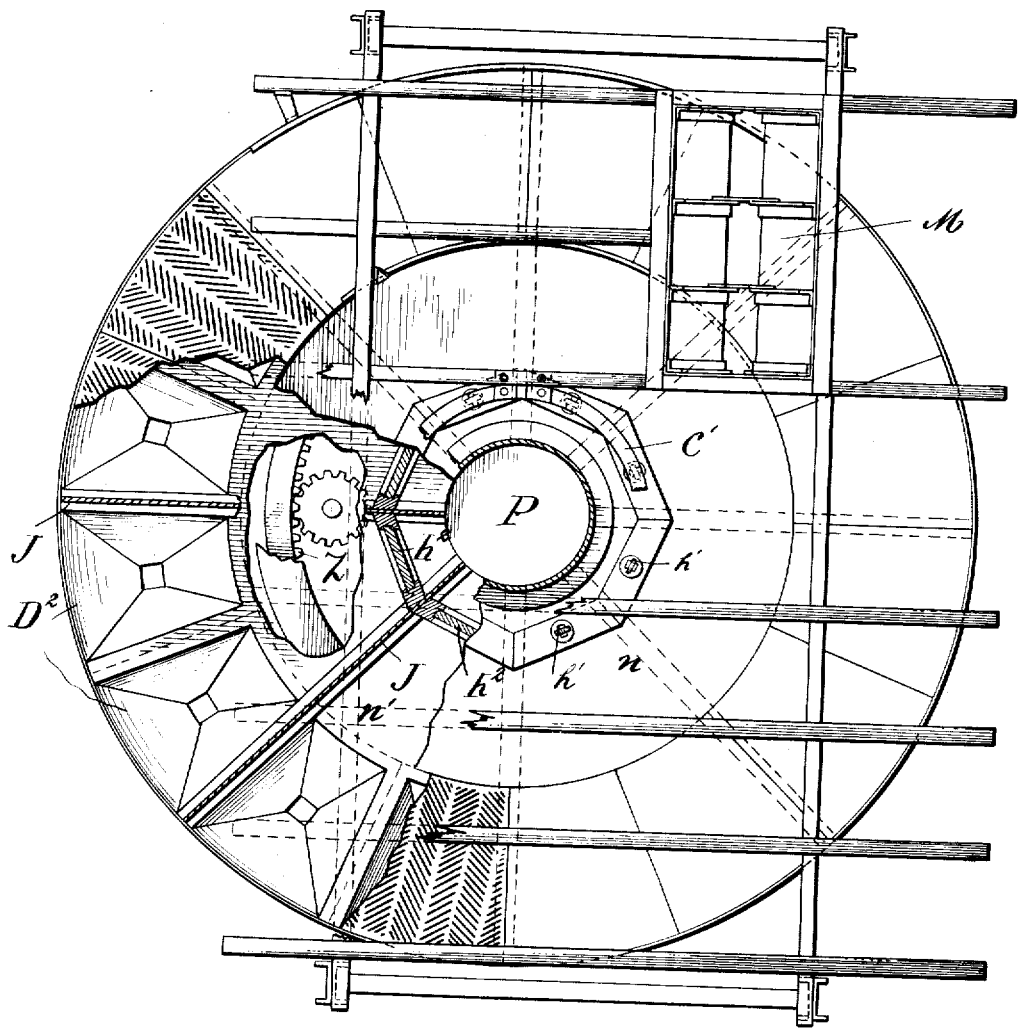

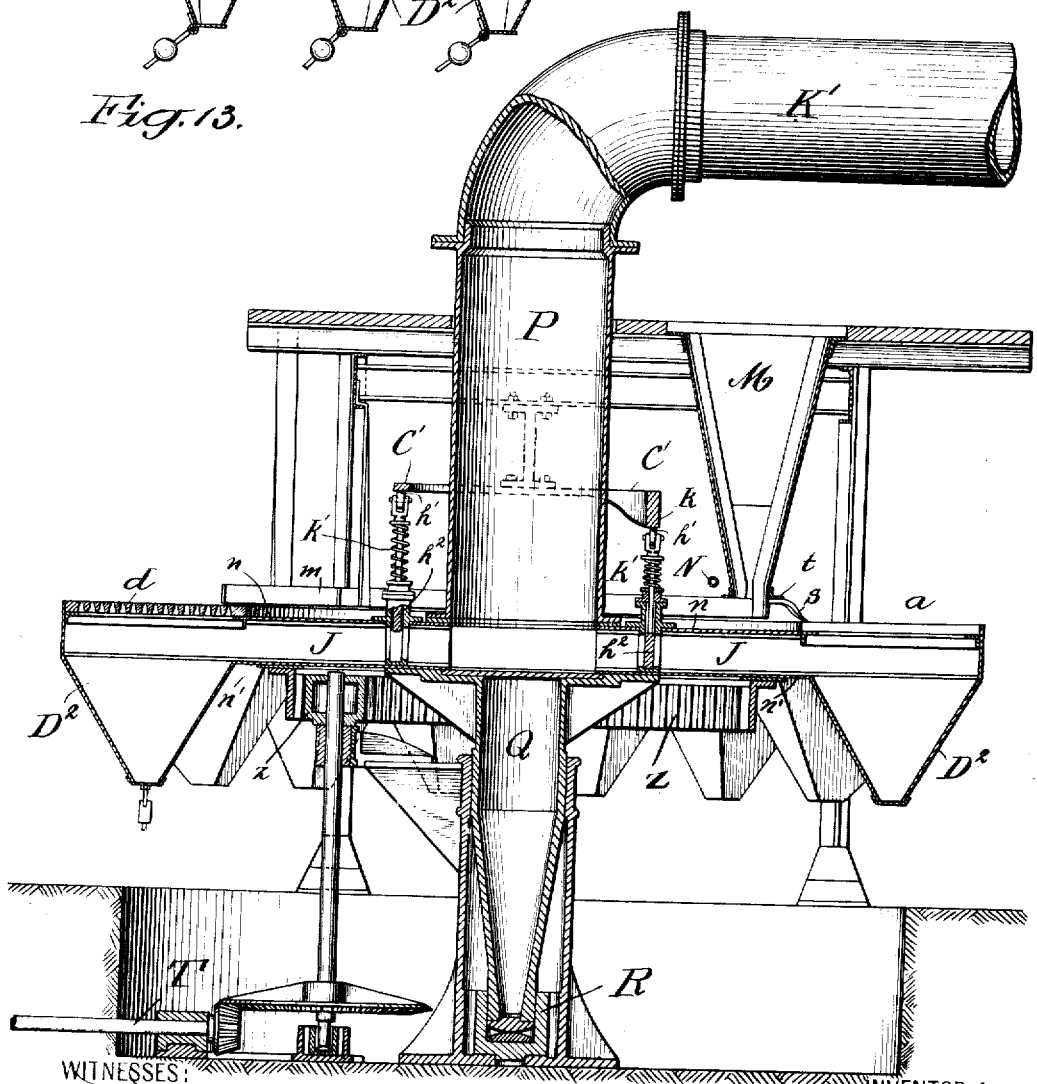

UNITED STATES PATENT OFFICE.

FRANZ MEYER, OF ENGLEWOOD, NEW JERSEY, ASSIGNOR TO DWIGHT & LLOYD METALLURGICAL COMPANY, OF NEW YORK, N. Y., A CORPORATION OF NEW JERSEY.

CALCINING, DESULFURIZING, AND AGGLOMERATING ORES, &c.

1,166,142.  Specification of Letters Patent.  Patented Dec. 28, 1915.

Application filed November 9, 1907, Serial No. 401,476.  Renewed September 11, 1913.  Serial No. 789,380.

*To all whom it may concern:*

Be it known that I, FRANZ MEYER, a subject of the Emperor of Germany, residing at Englewood, county of Bergen, and State of New Jersey, have invented certain new and useful Improvements in Calcining, Desulfurizing, and Agglomerating Ores and like Materials; and I do hereby declare the following to be a full, clear, and exact description of the invention, such as will enable others skilled in the art to which it appertains to make and use the same.

My invention relates to the calcining, desulfurizing, agglomerating and volatilizing of ores and like materials, and more particularly to an apparatus wherein the charge is fed in a uniform layer upon an annular grate rotatable bodily about an upright axis, the arrangement being such that the charge will be spread out upon the upper flat grate surface, and when so spread and ignited is subjected to the action of air or other suitable aeriform fluid drawn or forced through it.

The air, or other aeriform fluid, drawn or forced through the charge, is preferably controlled in such manner that the desired quantity appropriate to each particular section of the grate may be supplied thereto. For instance, at the initial section of the grate, where the raw ore is fed and ignited, it will, in general, be desirable to furnish the minimum quantity of air to the charge; whereas, as the charge progresses toward the more advanced sections of the grate, it will usually be convenient to gradually or successively increase the supply of air. Finally, at the discharge section of the grate, it should again be wholly or substantially cut off. The control of the air supply is preferably automatic and may conveniently be effected by dividing up the space beneath the grate into separate compartments, each having its individual communication with the exhauster or compressor, and each having a controlling valve slightly open when the section occupies its initial position immediately in advance of the ore feed, closed when said section occupies its final or discharge position, and at varying degrees of closure between the two extremes. This automatic, gradual closing and subsequent reopening of the valves of the individual grate compartments may be accomplished by means of a stationary cam track operating upon the stems of the spring seated valves, as will hereinafter more fully appear.

In the preferred embodiment of my invention the rotary grate is carried by a central mast, which is itself hollow and which communicates with the several grate compartments by radial conduits in which the controlling valves are located. These radial conduits may themselves carry the grate and their carrying function may be in part relieved by supplementary supporting wheels for the grate body.

The individual compartments beneath the grate surface may be formed if desired by annular plates dipping into a water seal and cross partitions likewise dipping into the sealing body of water. Preferably, however, they consist of hopper-like receptacles forming a tight joint with the several sections of the grate and provided with discharge gates at their lower ends, whereby the material which passes through the grate apertures may be removed and, if insufficiently roasted, may be returned to the feed hopper.

Other features of construction and arrangement will be hereinafter more particularly described with reference to the accompanying drawings, wherein—

Figure 1 represents a general plan view of an apparatus embodying the main features of my invention, said view being partly in section and with certain of the parts shown as broken away, for clearness of illustration of the remainder; Fig. 2 represents a section and partial elevation on the line 2—2 of Fig. 1; Fig. 3 represents a fragmentary sectional view through the upper part of the rotatable grate; Fig. 4 represents a detailed view, showing the manner in which the annular cam track operates the air-controlling valves; Figs. 5 and 6 represent respectively a plan view and section of a portion of the rotary grate; Fig. 7 represents in elevation and partial section the mechanism for rotating the grate; Fig. 8 represents in plan and partial section, on the line 8—8 of Fig. 2, a portion of the rotary grate and its feed hopper; Fig. 9 represents in section a modified form of the rotary grate and its adjuncts; Fig. 10 represents a section thereof on the line 10—10 of Fig. 9; Figs. 11 and 12 represent respectively views corresponding to Figs. 1 and 2, of a modified form of the apparatus; and Fig. 13 represents in cross section the construction of the grate and hoppers shown in said modification.

Similar letters of reference indicate similar parts throughout the several views.

Referring first to the form of apparatus shown in Figs. 1 to 8, inclusive, it will be noted that the rotatable grate or carrier consists conveniently of a series of plate sections $d$ provided with suitable slots $a$ as shown more fully in Figs. 5 and 6. These plates or grate sections are supported upon an annular framework which is made up of the concentric frames A, A′, and these frames are connected together and braced by the radial ribs or partitions $b$, the frames themselves being preferably made up of a number of sections, as shown more fully in Fig. 1. The grate, as thus constructed, is carried by a central mast, as shown, but a great part of its weight is likewise sustained by means of the trucks B, B′, which travel on the annular tracks C, C′. The outer periphery of the frame A is cut or cast to form a gear which meshes with a pinion $d'$ (see Fig. 7) which is mounted on a step stud $d''$ journaled in a bracket extending from the standard $e$. The pinion $d'$ is driven from the pulley $f$, which drives the worm $f'$ intermeshing with the worm gear $g$ fastened to the upper end of the shaft $d''$.

Immediately beneath the grate is an annular trough D for the reception of a body of water, and depending from the walls of the annular frames A, A′ are the annular curtains E, E′, which dip well within the water contained in the trough. The sealed inclosure thus formed beneath the grate is further divided into individual compartments by the radially extending curtains F depending from the ribs $b$. From each of the individual compartments so formed there is an exit passage G from which a pipe H extends to the hollow interior I of the central mast, which mast is journaled in a step bearing I′ at the axial center of the apparatus. The upper portion $i$ of the mast extends within a stationary tube K, and a cup $i'$ adapted to receive a suitable sealing material, such as water or sand, insures against the exit of gases at the sealed joint thus provided. The pipe K either communicates with an air blower or compressor for forcing air upwardly through the charge on the grate, or preferably, with an exhausting device, such as an air exhauster or a chimney flue, so as to draw air downward through the charge on the grate. I prefer the latter arrangement for the reason mainly that it avoids the necessity of providing a hood for conveying away the fumes from the burning ore charge, and that it permits the operators to more carefully supervise the proper working of the apparatus.

In each of the pipes H, between its grate compartment and the hollow mast, is a gate valve $h$, whose stem is provided with a spring $k'$ tending to hold the valve open. The stem terminates in a roller $h'$ traveling upon an annular cam track $k$, the arrangement being such that when the roller $h'$ is at the summit of the maximum rise of the cam track, the valve will be closed, or practically closed, thereby cutting off the passage of aeriform fluid through the pipe H.

A suitable frame-work is supported above the apparatus by the posts or standards L. This frame-work supports tne hopper M, one of whose walls is carried down to substantially the upper surface of the grate, whereas, the opposite wall terminates at a distance above the grate equal to the thickness desired for the layer of ore to be supplied thereto. With the parts arranged as in Figs. 1 and 2, a counter-clockwise rotation is given to the grate so that the ore is fed from the hopper in a uniform layer of the desired thickness. It will, of course, be apparent that by providing an additional hopper in the rear of the hopper shown in Figs. 1 and 2, and having its discharge aperture at a suitable elevation with respect to the discharge aperture of the first hopper, a second layer of material may be deposited upon the first layer. This is of particular service when in drawing an aeriform fluid through the grate the layer first supplied to the grate contains little or no combustible material and where it is desired to supply a combustible material from a separate source. In forcing an aeriform fluid through the grate, the layer first supplied must, of course, contain the combustible material. An instance of this would be furnished by the treatment of zinc ores for the manufacture of zinc oxid, the pulverized coal, or other combustible, being fed from the first hopper, and the zinc ore or a mixture of the ore and of coal being supplied from the second hopper, so as to form a layer of ore superimposed upon the layer of coal. Where zinc ore is to be treated, it will, of course, be understood that the apertures in the grate plates are to be suitably restricted in area as in the grates of the ordinary Wetherill furnaces for like purposes, and that, if zinc oxid is to be made by forcing air through the charge a suitable hood is to be arranged over the grate, which hood is to be connected with a bag-house or similar means to collect the zinc oxid formed.

In order to prevent the ore or other material from falling off the sides of the grate, especially during the early part of the operation, and when the material treated contains insufficient agglomerating constituents, guards $m$, $m'$, are provided, which extend from the hopper along the edges of the grate for a suitable distance. The necessary distance depends upon the character of the ore treated, but the object is to continue the guards until the ore has become sufficiently agglomerated or fused to such an extent that there is no longer any tendency for it to fall off from the sides of the grate, it being understood that if the ore treated is not of an agglomerating character, the guards will be continued for the entire extent of the grate periphery. These guards are supported from the frame-work as illustrated in Figs. 1 and 2.

For the purpose of calcining, desulfurizing and agglomerating such ores as contain sufficient sulfur, or other combustible material, it is only necessary to ignite the layer as it is deposited upon the grate from the feed hopper, and to draw or force air through the grate and the layer of ore thereon.

In calcining carbonates, or in agglomerating ores, or like material, containing no sulfur, or very little sulfur, (as, for example, pyrites cinder) the ore is mixed with enough fuel to accomplish the calcination or agglomeration; and, if need be, a suitable quantity of fluxing material is added to the charge before it enters the feed hopper. In roasting agglomerating sulfids, containing enough sulfur to complete the roasting reaction after it has been started, no admixture of fuel is necessary. In either case, however, the charge must be ignited, and, when blowing air through the charge, I prefer to ignite it by spreading a thin layer of glowing coal, or of hot calcines from a previous charge, on the grate and by feeding the new charge upon this hot layer. When air is drawn through the charge, the charge is preferably ignited by an oil or gas flame from the pipe N, shown in Figs. 2 and 8.

When the air is drawn through the grate by a fan or chimney draft connected to the pipe K, the operation is as follows: The charge is fed continuously in a uniform layer from the hopper M, upon the grate, which revolves in a counter-clockwise direction. When the charge arrives beneath the pipe N it is ignited by the flame from that pipe. The combustion of the fuel or of the sulfur in the charge is maintained by drawing air through the charge by means of the fan or chimney draft. The quantity of air drawn through the charge in the various stages of the roasting and agglomerating process is automatically regulated by the action of the cam track upon the valves in the several radial pipes H. The cam track is so constructed that, at the discharging section of the grate, it is so high that the valves are substantially closed. From this point, the track slopes gradually in opposite directions, so that at the ignition point the valves are partially open and consequently the flame and air are drawn through the charge. In running down the incline the valves open farther until they have reached their full open position, as will be readily understood. If it is desired for any purpose to vary the amount of air drawn through the charge at any particular point in the treatment, it is only necessary to make a corresponding incline at that point upon the track $k$. Regulation of the air current may thus be made at any desired point. In some classes of work, however, the regulation of the air may be dispensed with, and in that case, the valves $h$ and the partitions F may be omitted.

For the purpose of removing the charge from the grate I provide at the discharge section thereof a plow front, consisting preferably of a series of teeth $s$ which serve to lift, detach and break up the mass of agglomerated ore, or the like, and, when so broken up, the mass is diverted or shifted off of the grate by the abutment plate $t$, which may conveniently be attached to the rear of the hopper.

In Figs. 9 and 10, I have illustrated a modified form for the chamber or chambers beneath the grate surface. In these figures, instead of the stationary annular trough and the traveling annular curtains with the interposed water seal, I employ a closed chamber D' of hopperlike form, which is rigidly secured to the rings A, A' and which is provided at intervals with suitably weighted doors or gates $r$, through which the material which drops through the grate sections may be removed, and, if insufficiently roasted, calcined or agglomerated, may be returned to the grate surface through the feed hopper, or otherwise.

Another, and for many uses, a preferable modification of my invention is illustrated in Figs. 11, 12 and 13. In the apparatus shown in these figures, the rotary grate is supported upon a series of radial I-beams J, which communicate with the base of a hollow rotary mast P, and which rest upon the flange of an upright shaft Q mounted within a step-bearing R. The I-beams are covered above and below with suitable plates $n$, $n'$, and carry an annular toothed rack Z which meshes with a pinion $z$, adapted to be actuated from the power shaft T by means of intervening gearing, as shown. The upper end of the hollow mast P is journaled in the lower end of the stationary pipe K', the arrangement being such that the rotary grate, the I-beams and the central hollow mast form a rotating system.

The hopper M, the igniting pipe N and the discharging plow $t$, $s$, are of the same construction and arrangement with respect to the rotary grate, as are the corresponding elements of the modification shown in Figs.

1 to 8. Furthermore, the valves $h^2$ for controlling the aeriform fluid passing through the conduits formed by the bridging over of the I-beams J by the plates $n$, $n'$, have a like function and mode of operation as that of the corresponding valves $h$ of the form of apparatus shown in Figs. 1 to 8, and are similarly actuated by the corresponding cam track $C'$; although it will be understood that, as shown, the cam track is supported and located above the spring-seated valves which latter open upwardly, in this particular instance, for convenience of location and arrangement of the parts. So, also, in this modification of the invention it will be convenient to employ the same guards $m$, $m'$, for preventing any portion of the traveling ore body from leaving the grate along those sections thereof where agglomerating conditions do not exist, or where the ore, or other material treated, is not of an agglomerating character.

For convenience of manipulation and construction, I prefer in general to make the hopper-like receptacles $D^2$ of the same general character as the hopper receptacles shown in Fig. 9, but I prefer to provide two of these hoppers for each radial space between adjacent I-beams, as more fully shown in Figs. 11 and 13.

The general mode of operation of the apparatus shown in Figs. 11, 12 and 13 is the same as that employed in the use of the apparatus shown in the preceding figures, and, for that reason, need not be detailed at length, it being understood that the means for exhausting or for blowing the air or other aeriform fluid through the central mast, the radial air conduits, individual compartments below the grate, and the grate itself, are preferably connected as before to the stationary pipe in which the hollow mast is journaled. So, also, any portions of the material which pass through the grate and are collected in the hopper-like receptacles, may be removed therefrom through the weighted discharge gates, either automatically or manually, for further treatment, if desired.

It will, of course, be understood that in all of the modifications of the apparatus, it will be desirable to impart a comparatively slow rotation to the moving parts, so that ample time will be afforded for the complete calcining, desulfurizing or agglomerating of the material before it reaches the discharge section of the grate.

I do not in this application claim the axially arranged air sealing mechanism illustrated in Fig. 2 of the drawings, nor the annular trough adapted to contain air sealing material into which project guard plates carried by the grate, also illustrated in said Fig. 2, as such features are made the subject of and claimed in an application filed by me on the 13th day of January, 1911, Ser. No. 603,037, as a division of this case.

Having thus described my invention, what I claim is:—

1. Apparatus for the metallurgical treatment of ores and the like, consisting of a receiving grate for supporting the charge, means for revolving the grate bodily about an upright axis, means for feeding the charge to the grate in a uniform layer, means for causing aeriform fluid to traverse the charge, and means for automatically removing the treated charge from the grate as it passes a predetermined point in the grate's revolution, said means consisting of a scraper located at said point and having a plow front which detaches the charge from the grate and a diverting abutment in the rear of the plow front; substantially as described.

2. Apparatus for the metallurgical treatment of ores and the like, consisting of a receiving grate for supporting the charge, means for revolving the grate bodily, means for causing aeriform fluid to traverse the charge, and means for regulating the amount of aeriform fluid passing through individual portions of the charge, said means consisting of a series of conduits communicating with individual sections of the space below the grate valves located in said conduits and valve-shifting means in constant connection with the said valves, by which their positions at any and all parts of the course of travel of the grate may be accurately controlled; substantially as described.

3. Apparatus for the metallurgical treatment of ores and the like, consisting of a receiving grate for supporting the charge, means for revolving the grate bodily, means for causing aeriform fluid to traverse the charge, means for regulating the amount of aeriform fluid passing through individual portions of the charge, said means consisting of a series of valve-controlled conduits communicating with individual sections of the space below the grate, and a cam track for automatically governing the opening and closing of the valves; substantially as described.

4. Apparatus for the metallurgical treatment of ores and the like, consisting of an upright hollow mast, an outlying receiving grate for the charge, aeriform fluid conduits leading from below the grate to the hollow interior of the mast, spring-actuated slide-valves controlling the flow through said conduits, and automatic means for regulating the position of the valves as the structure revolves; substantially as described.

5. Apparatus for the metallurgical treatment of ores and the like, consisting of a receiving grate for the charge, a supply hopper for feeding the charge in a substantially uniform layer to the grate, guard rails for the charge, means for revolving the grate bodily, and means for causing aeriform fluid to traverse the charge; substantially as described.

6. Apparatus for the metallurgical treatment of ores and the like, consisting of an upright mast, an outlying grate carried thereby, a series of hoppers located beneath the grate, and means for causing aeriform fluid to traverse the charge; substantially as described.

7. Apparatus for the metallurgical treatment of ores and the like consisting of an annular grate surface on which the charge is delivered, a series of hoppers located beneath such grate surface, doors or gates closing openings through which the said hoppers may be discharged, and air conduits connected with the hoppers constituting part of a system for causing aeriform fluid to pass through the charge supported upon the grate surface, substantially as described.

8. In an apparatus for agglomerating ores and like materials, the combination of a grate for supporting the charge, means for delivering the charge to the grate in a relatively thin layer, means for causing aeriform fluid to traverse the charge, and means for automatically removing the treated charge after agglomeration consisting of a plow front and a diverting abutment in rear of the plow front.

9. In an apparatus for the metallurgical treatment of ores and the like, the combination of an annular grate upon which the charge is placed, an air chamber situated within the space surrounded by the said grate, air conduits leading from below successive sections of the grate to the said chamber, valves for controlling the flow of air through the said conduits, an annular cam track for regulating the positions of the valves, means for causing the valves to be operated by successive portions of the cam as the charge on successive sections of the grate is treated, and air moving means connected with the said air chamber.

10. In apparatus for the roasting and sintering of ores, comprising individual sections of a grate pervious to air on which the material to be trated is supported, and means for causing air to pass through the material when upon said pervious support, means for regulating the amount of air passing through individual portions of the material, consisting of separate air chambers individual to the sections of the support for the material through which the air that passes through the material flows, conduits communicating with the said air chambers respectively, valves in said conduits, and valve-shifting means in constant contact with the said valves arranged to control the positions of the valves at any and all times during which the material on the grate is being treated.

In testimony whereof I affix my signature, in presence of two witnesses.

FRANZ MEYER.

Witnesses:
JOHN C. PENNIE,
M. LOBEL.

It is hereby certified that in Letters Patent No. 1,166,142, granted December 28, 1915, upon the application of Franz Meyer, of Englewood, New Jersey, for an improvement in "Calcining, Desulfurizing, and Agglomerating Ores, &c.," an error appears in the printed specification requiring correction as follows: Page 5, line 50, claim 10, for the word "trated" read *treated;* and that the said Letters Patent should be read with this correction therein that the same may conform to the record of the case in the Patent Office.

Signed and sealed this 25th day of July, A. D., 1916.

[SEAL.]                                                    F. W. H. CLAY,

*Acting Commissioner of Patents.*

Cl. 75—135.